US012277051B1

(12) United States Patent
Khankin

(10) Patent No.: US 12,277,051 B1
(45) Date of Patent: Apr. 15, 2025

(54) AUTOMATIC GENERATION OF PROCESSING ARCHITECTURE-SPECIFIC ALGORITHMS

(71) Applicant: Next Silicon Ltd, Givatayim (IL)

(72) Inventor: Daniel Khankin, Beer Sheva (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/432,136

(22) Filed: Feb. 5, 2024

(51) Int. Cl.
*G06F 11/36* (2006.01)
*G06F 8/41* (2018.01)

(52) U.S. Cl.
CPC .......... *G06F 11/3664* (2013.01); *G06F 8/447* (2013.01)

(58) Field of Classification Search
None
See application file for complete search history.

(56) References Cited

U.S. PATENT DOCUMENTS

| | | | | |
|---|---|---|---|---|
| 6,625,797 | B1 * | 9/2003 | Edwards | G06F 30/30 |
| | | | | 716/132 |
| 7,085,702 | B1 * | 8/2006 | Hwang | G06F 30/33 |
| | | | | 327/100 |
| 8,387,032 | B1 * | 2/2013 | Goldman | G06F 16/9574 |
| | | | | 717/136 |
| 9,420,027 | B1 * | 8/2016 | Elsner | H04L 65/611 |
| 9,558,305 | B1 * | 1/2017 | Popovici | G06F 30/00 |
| 9,678,726 | B1 * | 6/2017 | Massaguer | G06F 11/36 |
| 10,409,560 | B1 * | 9/2019 | Bebee | G06F 8/4441 |
| 10,705,800 | B2 * | 7/2020 | Brunel | G06F 11/3604 |

(Continued)

FOREIGN PATENT DOCUMENTS

CN 201711095873 A * 11/2017 .............. G06F 8/20

OTHER PUBLICATIONS

Hossain, "Virtual Radio Engine: A Programming Concept for Separation of Application Specifications and Hardware Architectures", 2005, Proc. 14th IST Mobile and Wireless Communications Summit (Year: 2005).*

(Continued)

*Primary Examiner* — Hossain M Morshed

(57) ABSTRACT

A method of generating automatically architecture-specific algorithms, comprising receiving an architecture independent algorithm and one or more algorithm parameters defining at least a target processing architecture and a format of an output of an architecture-specific algorithm implementing the received algorithm, determining automatically a functionality of the algorithm by analyzing the algorithm, selecting one or more architecture-specific computing blocks of the target processing architecture according to the functionality of the algorithm and the algorithm parameter (s) wherein each computing block is dynamically reconfigurable in runtime and associated with (1) simulation code simulating its functionality, and (2) execution code executing its functionality, testing an emulated architecture-specific algorithm constructed using the simulation code of the selected architecture-specific computing block(s) to verify compliance with the algorithm parameter(s), and, responsive to successful compliance verification, generating automatically an architecture-specific code segment implementing the architecture-specific algorithm based on the execution code of the selected architecture-specific computing blocks.

20 Claims, 4 Drawing Sheets

(56) References Cited

U.S. PATENT DOCUMENTS

| | | | | |
|---|---|---|---|---|
| 11,240,107 | B1* | 2/2022 | Gupta | G06Q 10/06315 |
| 2006/0044318 | A1* | 3/2006 | Cherdron | G06Q 10/06 345/581 |
| 2007/0168932 | A1* | 7/2007 | Seeger | G06F 8/34 717/105 |
| 2008/0244146 | A1* | 10/2008 | Das | G06F 13/4247 710/309 |
| 2013/0326474 | A1* | 12/2013 | Lane | G06F 8/34 717/107 |
| 2014/0137090 | A1* | 5/2014 | Whitcomb | G06F 8/47 717/163 |
| 2014/0223414 | A1* | 8/2014 | Mau | G06F 8/34 717/109 |
| 2017/0277521 | A1* | 9/2017 | Sharma | G06F 9/48 |
| 2018/0260212 | A1* | 9/2018 | Wisnovsky | G06F 16/134 |
| 2019/0163446 | A1* | 5/2019 | Brunel | G06F 8/74 |
| 2021/0366575 | A1* | 11/2021 | Zeng | C12Q 1/6874 |
| 2022/0121429 | A1* | 4/2022 | Haile | G06N 3/08 |
| 2022/0311598 | A1* | 9/2022 | Yankilevich | H04L 9/0637 |

OTHER PUBLICATIONS

Santambrogio, "Design methodology for partial dynamic reconfiguration: a new degree of freedom in the HW/SW codesign", 2008, IEEE (Year: 2008).*

Gschwind, "FPGA Prototyping of a RISC Processor Core for Embedded Applications", 2001, IEEE (Year: 2001).*

Moreno, "Evaluation of fault injection tools for reliability estimation of microprocessor-based embedded systems", 2023, Elsevier (Year: 2023).*

* cited by examiner

AUTOMATIC GENERATION OF PROCESSING ARCHITECTURE-SPECIFIC ALGORITHMS

FIELD AND BACKGROUND OF THE INVENTION

The present invention, in some embodiments thereof, relates to automatically generating processing architecture-specific algorithms, and, more specifically, but not exclusively, to automatically generating processing architecture-specific algorithms using architecture-specific building blocks.

As the use of computers and electronic devices continues to expand, the need for efficient and optimized software solutions becomes increasingly important. In many cases, software developers must manually create code that is optimized for specific hardware architectures, which can be a time-consuming and error-prone process.

Algorithms constitute a substantial part of most modern software solutions and platforms as they may address a wide and practically endless span of applications.

Such algorithms may target multiple processing architectures employing diverse hardware and/or software architectures which may be very different from each other, and it may be highly desired that the algorithms take full advantage of the hardware and/or software capabilities which may be specific to each processing architecture.

SUMMARY OF THE INVENTION

It is an object of the present invention to provide methods, systems and software program products for receiving architecture independent algorithms and creating architecture-specific code for these algorithms using architecture-specific building blocks of the target processing architecture. The foregoing and other objects are achieved by the features of the independent claims. Further implementation forms are apparent from the dependent claims, the description and the figures.

According to a first aspect of the present invention there is provided a method of generating automatically architecture-specific algorithms, comprising:

Receiving an architecture independent algorithm, and one or more algorithm parameters defining at least a target processing architecture and a format of an output of an architecture-specific algorithm implementing the received algorithm.

Determining automatically a functionality of the algorithm by analyzing the algorithm.

Selecting one or more of a plurality of architecture-specific computing blocks of the target processing architecture according to the functionality of the algorithm and the one or more algorithm parameters. Each of the plurality of architecture-specific computing blocks is dynamically reconfigurable in runtime according to the functionality of the algorithm. Each of the plurality of architecture-specific computing blocks is associated with (1) simulation code simulating functionality of the respective architecture-specific computing block, and (2) execution code executing the functionality of the respective architecture-specific computing block.

Testing an emulated architecture-specific algorithm constructed using the simulation code of the one or more selected architecture-specific computing blocks to verify compliance with the one or more algorithm parameters.

Responsive to successful compliance verification, generating automatically an architecture-specific code segment implementing the architecture-specific algorithm based on the execution code of the one or more selected architecture-specific computing blocks;

Wherein when executed by one or more processors utilizing the target processing Architecture, the architecture-specific code segment causes the one or more processors to execute the algorithm.

According to a second aspect of the present invention there is provided a system for generating automatically architecture-specific algorithms, comprising one or more processors executing a code. The code comprising:

Program instructions to receive an architecture independent algorithm and one or more algorithm parameters defining at least a target processing architecture and a format of an output of an architecture-specific algorithm implementing the received algorithm.

Program instructions to determine automatically a functionality of the algorithm by analyzing the algorithm.

Program instructions to select one or more of a plurality of architecture-specific computing blocks of the target processing architecture according to the functionality of the algorithm and the one or more algorithm parameters. Each of the plurality of architecture-specific computing blocks is dynamically reconfigurable in runtime according to the functionality of the algorithm. Each of the plurality of architecture-specific computing blocks is associated with (1) simulation code simulating functionality of the respective architecture-specific computing block, and (2) execution code executing the functionality of the respective architecture-specific computing block.

Program instructions to test an emulated architecture-specific algorithm constructed using the simulation code of the one or more selected architecture-specific computing blocks to verify compliance with the one or more algorithm parameters.

Program instructions to generate automatically, responsive to successful compliance verification, an architecture-specific code segment implementing the architecture-specific algorithm, based on the execution code of the one or more selected architecture-specific computing blocks;

Wherein when executed, by one or more processors utilizing the target processing architecture, the architecture-specific code segment causes the one or more processors to execute the algorithm.

In a further implementation form of the first and/or second aspects, the plurality of dynamically reconfigurable architecture-specific computing blocks comprise a plurality of reconfigurable logical elements supported by a plurality of memory units connectable via an interconnected network of an interconnected computing grid.

In a further implementation form of the first and/or second aspects, the architecture-specific code segment comprises one or more program instructions required for migrating the execution code of the one or more architecture-specific computing blocks to an execution environment of the target processing architecture.

In a further implementation form of the first and/or second aspects, the architecture-specific code segment comprises source code compiled and built using a toolchain adapted for the target processing architecture.

In a further implementation form of the first and/or second aspects, the architecture-specific code segment comprises a compute graph adapted for the target processing architecture.

In a further implementation form of the first and/or second aspects, the format of the output defines a precision of the output of the architecture-specific algorithm.

In an optional implementation form of the first and/or second aspects, an estimated error of the emulated architecture-specific algorithm is computed based on an error of the one or more selected architecture-specific computing blocks.

In an optional implementation form of the first and/or second aspects, one or more properties of one or more selected architecture-specific computing blocks are adjusted according to the estimated error.

In an optional implementation form of the first and/or second aspects, an estimated resource utilization of the architecture-specific algorithm is computed based on resource utilization of the one or more selected architecture-specific computing blocks.

In an optional implementation form of the first and/or second aspects, the one or more algorithm parameters further define one or more constraints relating to one or more of: a precision of the output, an accumulated error, a hardware resources utilization, a compute graph size, a cost, and/or an execution power consumption.

In an optional implementation form of the first and/or second aspects, responsive to failure to comply with the one or more constraints, the architecture-specific algorithm is emulated with a different selection of one or more of the plurality of architecture-specific computing blocks.

In an optional implementation form of the first and/or second aspects, responsive to failure to comply with one or more of the constraints, one or more of the constraints are relaxed.

In an optional implementation form of the first and/or second aspects, responsive to failure to comply with one or more of the constraints, one or more properties of one or more selected architecture-specific computing blocks are adjusted.

In a further implementation form of the first and/or second aspects, each of the plurality of architecture-specific computing blocks comprises one or more mathematical operators applied to one or more members of a group consisting of: floating-point, integer, and/or fixed-point.

In a further implementation form of the first and/or second aspects, the plurality of architecture-specific computing blocks comprise one or more complex architecture-specific computing blocks constructed of multiple architecture-specific computing blocks.

In a further implementation form of the first and/or second aspects, an error of one or more of the complex architecture-specific computing blocks is computed by aggregating an error of each of the multiple architecture-specific computing blocks constituting the respective complex architecture-specific computing block.

In a further implementation form of the first and/or second aspects, the execution code of each of the plurality of architecture-specific computing blocks comprises one or more of: hardware, firmware, software, and/or a combination thereof.

In a further implementation form of the first and/or second aspects, the target processing architecture comprises one or more of a plurality of processing architectures.

Other systems, methods, features, and advantages of the present disclosure will7 be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
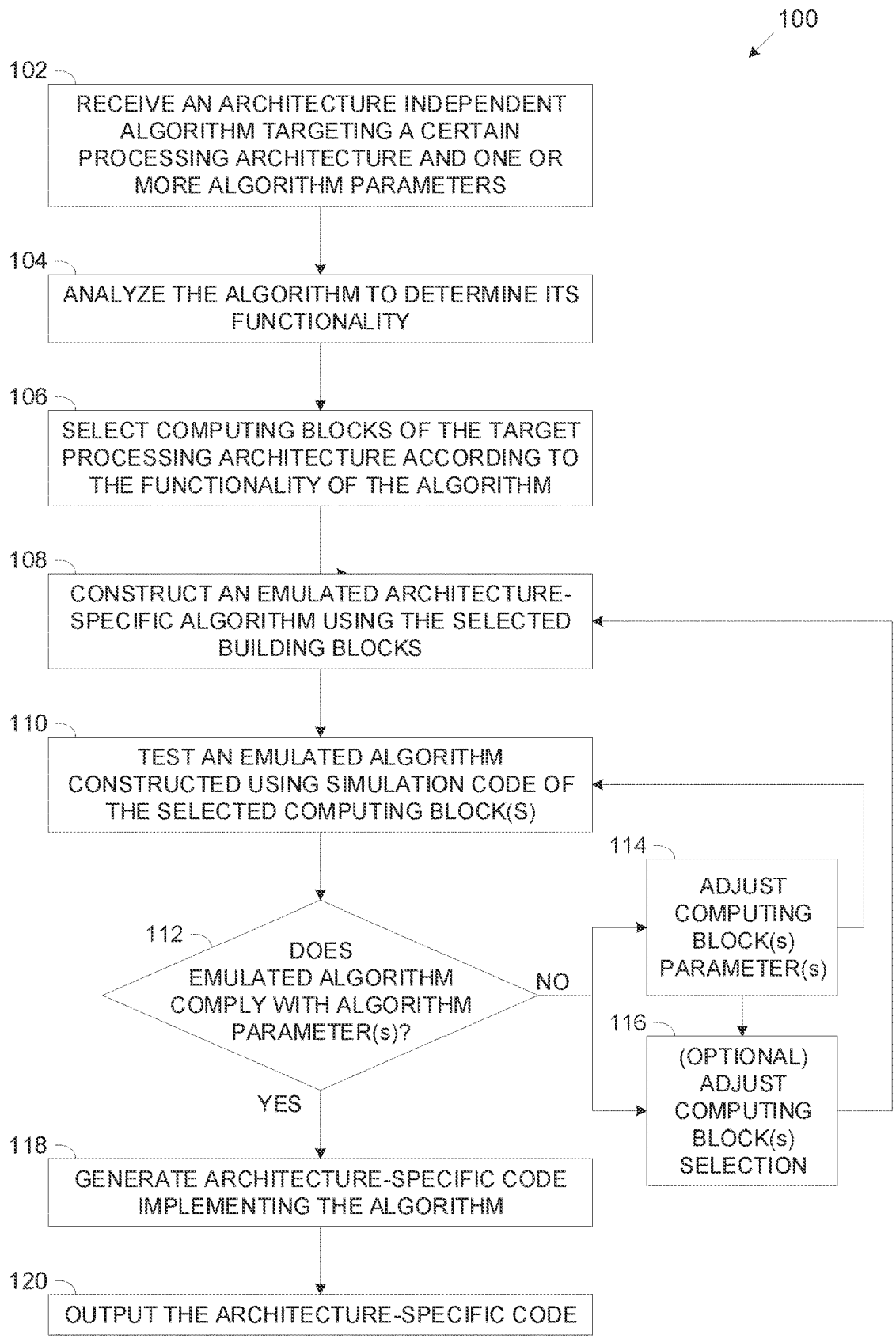
FIG. 1 is a flowchart of an exemplary process of automatically generating processing architecture-specific algorithms, according to some embodiments of the present invention.

The present invention, in some embodiments thereof, relates to automatically generating processing architecture-specific algorithms, and, more specifically, but not exclusively, to automatically generating processing architecture-specific algorithms using architecture-specific building blocks.

According to some embodiments of the present invention, there are provided apparatuses, methods and computer program products for automatically generating processing architecture-specific algorithms. Specifically architecture-specific code may be generated for one or more target processing architecture which implements an algorithm received in architecture independent form and thus may not be executable in the target processing architectures.

One or more algorithm parameters may define the received algorithm, its operational behavior, execution mode and/or the like. Essentially, the algorithm parameters may define at least (1) a target processing architecture for executing the algorithm, for example, x86, ARM, ARC, Digital Signals Processor (DSP), Graphic Processing Unit (GPU), proprietary processing architecture, and/or the like, and (2) a format, including the precision, of the (target) output of the algorithm, for example, floating-point binary32, fixed-point Q1.63, 32-bit unsigned integer, and/or the like.

The algorithm parameters may further define one or more parameters, attributes, and/or constraints relating to the execution of the algorithm when executed by processor(s) utilizing (employing) the target processing architecture, for example, accuracy (error), resource utilization, latency, and/or the like.

The architecture-specific code may be created using one or more predefined architecture-specific computing blocks of the target processing architecture. The architecture-specific computing blocks may comprise basic computing blocks facilitating operators, for example, mathematical operators, logical operators, and/or the like which are supported by the target processing architecture which may comprise hardware acceleration, high efficiency instruction sets and/or software stacks, and/or the like.

In particular, the target processing architecture may support runtime reconfiguration according to the computation task(s) executed at any given time. As such, the target processing architecture may comprise one or more architecture-specific computing block(s) which are dynamically reconfigurable in runtime according to the computation task they are applied to execute. For example, the target processing architecture may comprise an interconnected computing grid comprising a plurality of reconfigurable logical elements and a plurality of memory units connectable via an interconnected network.

The architecture-specific computing blocks may further include one or more high-level complex computing blocks constructed and/or integrating multiple basic computing blocks which may be adjusted, customized and/or integrated to facilitate higher-level operations.

Each of the plurality of architecture-specific computing blocks may be associated with simulation code and execution code.

The simulation code of architecture-specific computing blocks may simulate the functionality of the respective architecture-specific computing block as if executed in the target processing architecture. Moreover, the simulation code may be oblivious to processing architecture and may be thus executed by practically any processor independent of its processing architectures. This is in contrast to the execution code associated with the respective architecture-specific computing block which may comprise code executable by processors utilizing the target processing architecture to execute the computation operation(s) of the respective computing block according to its parameters.

The received algorithm may be first analyzed to identify and determine its functionality, i.e., what is the problem solved by the algorithm, the method applied to solve the problem, and/or the like. One or more architecture-specific computing blocks of the target architecture may be then selected accordingly to implement the identified functionality of the algorithm.

An emulated architecture-specific algorithm may be then constructed based on the simulation code associated with the selected architecture-specific computing blocks. Since the simulation code of the architecture-specific computing blocks reflects the execution of these architecture-specific computing blocks as if executed by the target processing architecture, the emulated architecture-specific algorithm and its target output may be evaluated as if executed by the target processing architecture.

In particular, the architecture-specific algorithm and its target output may be tested to evaluate and/or determine whether the architecture-specific algorithm and/or its output comply with one or more constraints defined by the algorithm parameters. For example, the error of the architecture-specific algorithm may be evaluated based on error values defined for the architecture-specific computing blocks selected to construct and implement the architecture-specific algorithm. In another example, the latency (execution time) of the architecture-specific algorithm may be evaluated for compliance verification of the latency defined for the selected architecture-specific computing blocks. In another example, resource utilization, for example, Integrated Circuit (IC) real-estate resources, power consumption, and/or the like of the architecture-specific algorithm may be evaluated based on resource utilization defined for the selected architecture-specific computing blocks.

Optionally, the architecture-specific algorithm may be evaluated iteratively in multiple iterations where in each iteration one or more of the attributes (parameters) of one or more of the selected architecture-specific computing blocks may be adjusted in an attempt to comply with the constraint(s). Moreover, one or more iterations may be initiated with an adjusted selection of architecture-specific computing blocks and reevaluated to check their compliance.

After ensuring that the architecture-specific algorithm and its target output comply with the constraint(s), one or more architecture-specific code segments may be generated based on the execution code of the architecture-specific computing blocks selected to implement the architecture-specific algorithm.

The generated code may be then executed by one or more processors employing the target processing architecture to execute the algorithm.

Automatically generating architecture-specific code implementing generic and/or high-level algorithms may present major benefits and advantages compared to currently existing code generation methods and systems.

First, automatically generating architecture-specific algorithms for multiple target processing architectures may significantly reduce and potentially completely eliminate manual labor typically involved with the adaptation of algorithms to different processing architectures and/or formats and/or precision as may be done by the existing methods. This may of course significantly reduce time, resources and/or potential human errors typical to such manual tasks. Also, converting algorithms which are already available for one processing architecture to another may be highly rapid, simple, and/or fast.

Moreover, while some of the existing methods may generate high-level code targeting different processing architectures, the algorithm implementation resulting from such methods may be highly limited and may not take advantage of the full hardware and/or software capabilities of the target processing architecture. In contrast, automatic generation of the architecture-specific algorithms using the computing blocks supported by the target processing architecture may harness the full hardware and software capabilities of the target processing architecture including specific hardware acceleration resources, modules, and/or engines to accelerate the execution of the algorithm while ensuring high performance, efficiency, accuracy and/or robustness.

Furthermore, through adjustment, modification, and manipulation of execution properties and parameters of the architecture-specific computing blocks, the automated generation of architecture-specific algorithms may support quick and rapidly available algorithm implementations which are specifically tailored per available hardware in terms of accuracy, precision, hardware utilization, power consumption, latency (execution time), and/or the like.

In addition, based on analysis of the received algorithm targeting a specific processing architectures supporting dynamic reconfiguration in runtime, the automated architecture-specific algorithms generation may accurately select dynamically reconfigurable architecture-specific computing blocks which may execute the received algorithm and adapt, in runtime, to changing computing demands by the algorithm over time. As such, the accurately selected dynamically reconfigurable architecture-specific computing blocks may execute the algorithm with increased efficiency, for example, higher performance, reduced computing time, reduced hardware resource utilization, and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to the drawings, FIG. 1 is a flowchart of an exemplary process of automatically generating processing architecture-specific algorithms, according to some embodiments of the present invention.

An exemplary process 100 may be executed to generate architecture-specific code for a target processing architecture which implements an algorithm received in architecture-independent form. As such, the algorithm may be received in one or more forms which are not executable in one or more processing architectures, specifically not in a target processing architecture defined for the process 100.

The architecture-specific code is created using one or more predefined architecture-specific computing blocks of the target processing architecture. Each of the architecture-specific computing blocks may comprise simulation code and execution code. The simulation code may simulate and/or emulate functionality of the respective architecture-specific computing block as if executed by the target processing architecture while the execution code may execute the functionality of the respective architecture-specific computing block on the target processing architecture.

An emulated architecture-specific algorithm constructed from one or more selected architecture-specific computing blocks may be tested, for example, simulated to verify its compliance with one or more algorithm parameters, interchangeably designated algorithm execution parameters, defined for the execution of the algorithm by the target processing architecture.

In case the emulated architecture-specific algorithm complies with algorithm execution parameter(s), an architecture-specific code segment implementing the algorithm may be generated and output for execution by one or more processors utilizing the targeted processing architecture.

Otherwise, in case the emulated architecture-specific algorithm does not comply with the algorithm execution parameter(s), the process may be iterated in one or more iterations in which another emulated architecture-specific algorithm may be constructed using one or more other architecture-specific computing blocks, one or more adjusted architecture-specific computing blocks, and/or a combination thereof, until the emulated architecture-specific algorithm complies with algorithm execution parameter(s).

Figure 2:
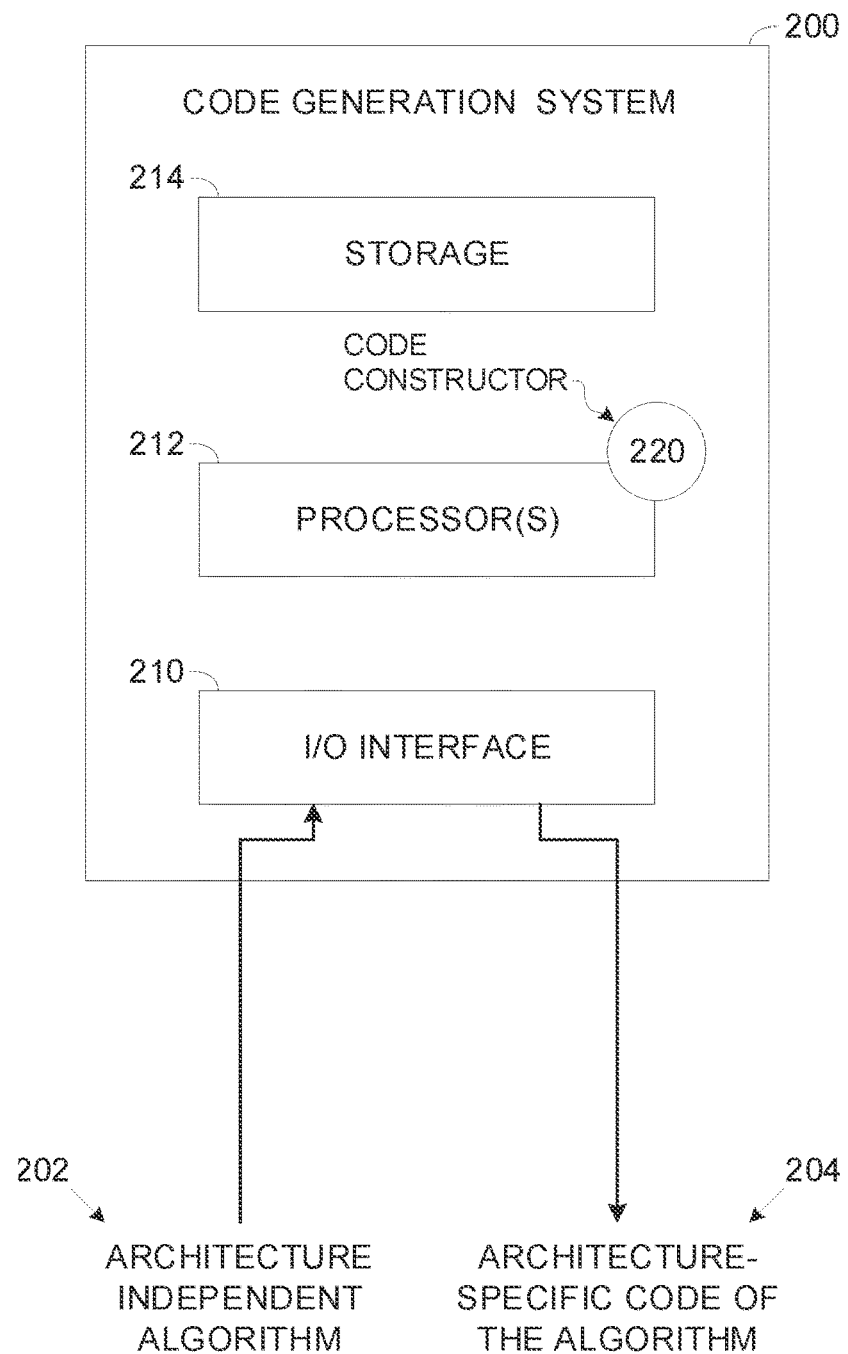
FIG. 2 is a schematic illustration of an exemplary system for automatically generating processing architecture-specific algorithms, according to some embodiments of the present invention.

Reference is also made to FIG. 2, which is a schematic illustration of an exemplary system for automatically generating architecture-specific algorithms, according to some embodiments of the present invention.

An exemplary code generation system 200 may be adapted to receive one or more algorithms 202 and output respective architecture-specific code segments 204 executing the received algorithms in one or more target processing architectures, i.e., by one or more processors utilizing the target processing architectures.

The code generation system 200, for example, a computer, a server, a computing node, a cluster of computing nodes and/or the like may include an Input/Output (I/O) interface 210, a processor(s) 212 for executing the process 100, and a storage 214 for storing data and/or computer program code (program store).

The I/O interface 210 may include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN), and/or the like. Via the I/O interface 210, the training system 200 may communicate with one or more external and/or attachable devices, for example, an attachable storage media (e.g., memory stick, etc.), a nearby device (e.g., mobile device, etc.), and/or the like. The I/O interface 210 may further include one or more wired and/or wireless network interfaces for connecting to a network comprising one or more wired and/or wireless networks, for example, a Local Area Network (LAN), a WLAN (e.g. Wi-Fi), a Wide Area Network (WAN), a Metropolitan Area Network (MAN), a cellular network, the internet and/or the like.

Via the I/O interface 210, the code generation system 200 may therefore receive the algorithm(s) 202 and/or output the code segments 204 generated to execute the algorithm(s) 202 on the target processing architecture. For example, the code generation system 200 may fetch one or more algorithms 202 from one or more attachable devices attached to one or more ports of the I/O interface 210, for example, a storage media device, a mobile device, and/or the like. Complementary, the code generation system 200 may store one or more code segments 204 in one or more attachable devices attached to one or more ports of the I/O interface 210. In another example, the code generation system 200 may communicate, via the network, for example, the internet, with one or more remote resources, for example, a server, a storage server, a cloud service, and/or the like to receive one or more algorithms 202 and/or output one or more code segments 204.

The processor(s) 212, homogeneous or heterogeneous, may include one or more processing nodes arranged for parallel processing, as clusters and/or as one or more multi-core processor(s). The storage 214 may include one or more non-transitory memory devices, either persistent non-volatile devices, for example, a ROM, a Flash array, a hard drive, a Solid State Drive (SSD), and/or the like and/or one or more volatile devices, for example, a RAM device, a cache memory and/or the like. The storage 214 may further comprise one or more local and/or remote network storage resources, for example, a storage server, a Network Attached Storage (NAS), a network drive, a cloud storage service and/or the like accessible via the network.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212. Optionally, the processor(s) 212 may include, utilize and/or apply one or more hardware elements available in the code generation system 200, for example, a circuit, a component, an Integrated Circuit (IC), an ASIC, an FPGA, a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware elements and/or a combination thereof. For example, the processor(s) 212 may execute a code constructor 220 configured to execute the process 100 and/or part thereof for generating one or more code segments 204 implementing the received algorithm 202 for execution by one or more processors utilizing one or more target processing architectures.

It should be noted that the process 100 may be executed by one or more processors of the processor(s) 212 such that each processor of the processor(s) 212 may execute the process 100 and/or part thereof or it may not participate at all in execution of the process 100.

Optionally, the code generation system 200, specifically, code constructor 220 may be executed, implemented and/or utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (Ec2), IBM Cloud, and/or the like.

For brevity, the process 100 is described for generating an architecture-specific code segment 204 for execution of a single algorithm by one or more processors utilizing a single target processing architecture. This, however, should not be construed as limiting since the process 100 may be duplicated, expanded and/or scaled to generate architecture-specific code segments 204 for a plurality of algorithms to be executed by processors utilizing the target processing architecture. Moreover, the process 100 may be duplicated, expanded and/or scaled to generate architecture-specific code segments 204 for execution of the algorithm by a plurality of processors utilizing a plurality of different target processing architectures.

As shown at 102, the process 100 starts with the code constructor 220 receiving an algorithm 202 which needs to be converted to an architecture-specific algorithm targeting a specific processing architecture.

For example, the received algorithm 202 may implement a correctly-rounded elementary function such as, for example, sine function, cosine function, logarithmic function, and/or the like targeting a certain processing architecture which may have a limited set of operations for a certain format, for example, binary32, utilizing a polynomial approximation and/or a look-up table.

To this end, the code constructor 220 may automatically generate one or more architecture-specific code segments 204, executable by processors utilizing (employing) the target processing architecture, which implement the received algorithm 202.

In particular, the algorithm 202, for example, a numerical algorithm, and/or the like may be architecture independent. For example, the algorithm 202 may be received in the form of pseudocode and/or one or more flowcharts. As such, the received algorithm 202 may not be directly executed by any processor utilizing any processing architecture, let alone processor(s) utilizing the target processing architecture. In another example, the algorithm 202 may be coded and/or programmed in one or more high-level, architecture independent, and/or cross platform coding languages (e.g., JavaScript, Python, etc.), multi-paradigm language (e.g., MATLAB, etc.), and/or the like which are executable by a plurality of computing architectures regardless of their specific hardware architecture. In such a case, the received algorithm 202 may not be effectively executed by processors employing the target processing architecture since it may not be adapted to utilize and take advantage of the specific architecture, Instruction Set Architecture (ISA), inherent hardware capabilities, and/or resources of the specific target processing architecture.

Together with the algorithm, the code constructor 220 may therefore receive one or more algorithm parameters defining one or more aspects of the algorithm 202, for example, a parameter, an attribute, a functionality, a capability, a constraint, a feature, a configuration, and/or the like.

Specifically, the algorithm parameters may define at least the target processing architecture. The target processing architecture defined by one or more algorithm parameters may include, for example, a computer architecture also designated ISA, for example, x86, ARM, ARC, GPU, DSP, and/or the like. In another example, one or more algorithm parameters may define a bit size of the target computer architecture, for example, 32-bit, 64-bit, and/or the like. In another example, one or more algorithm parameters may define one or more hardware modules available by the target processing architecture, for example, a hardware acceleration engine, such as, for example, a multiply-add engine, a convolution engine, a neural network, and/or the like.

According to some embodiments of the present invention, the target processing architecture may comprise one or more specific processing architectures which employ specific, custom, and/or proprietary hardware architecture, specifically, hardware architectures which are based on extensive hardware acceleration which is optionally reconfigurable in runtime according to the executed compute graph projecting the executed code, for example, the algorithm 202 on the hardware elements of the processor(s).

The compute graph is a graph representing high-level code to model the execution of at least some part of a program, including computations, memory access, and control flow. Size of a compute graph may translate to the area on the processing circuit IC but may not serve as an absolute upper bound since it does not take into account hardware layout constraints meaning that the actual area consumed by the compute graph on the processing circuit IC may depend on additional factors.

For example, the code constructor 220 may execute the process 100 to create one or more architecture-specific code segments implementing the received algorithm 202 for exaction by one or more processors comprising an interconnected computing grid comprising a plurality of reconfigurable logical elements and a plurality of memory units connectable via an interconnected network. In particular, the architecture-specific code segments generated by the code constructor 220 for implementing the received algorithm 202 may comprise a compute graph configured to project the architecture-specific algorithm on the interconnected computation grid.

The interconnected computation grid may dynamically adjust in runtime according to the projected algorithm on at least some of the reconfigurable logical elements by reconfiguring the interconnected network accordingly, for example, reconfiguring one or more configurable data routing junctions, one or more ingress ports and/or one or more egress ports.

Figure 3:
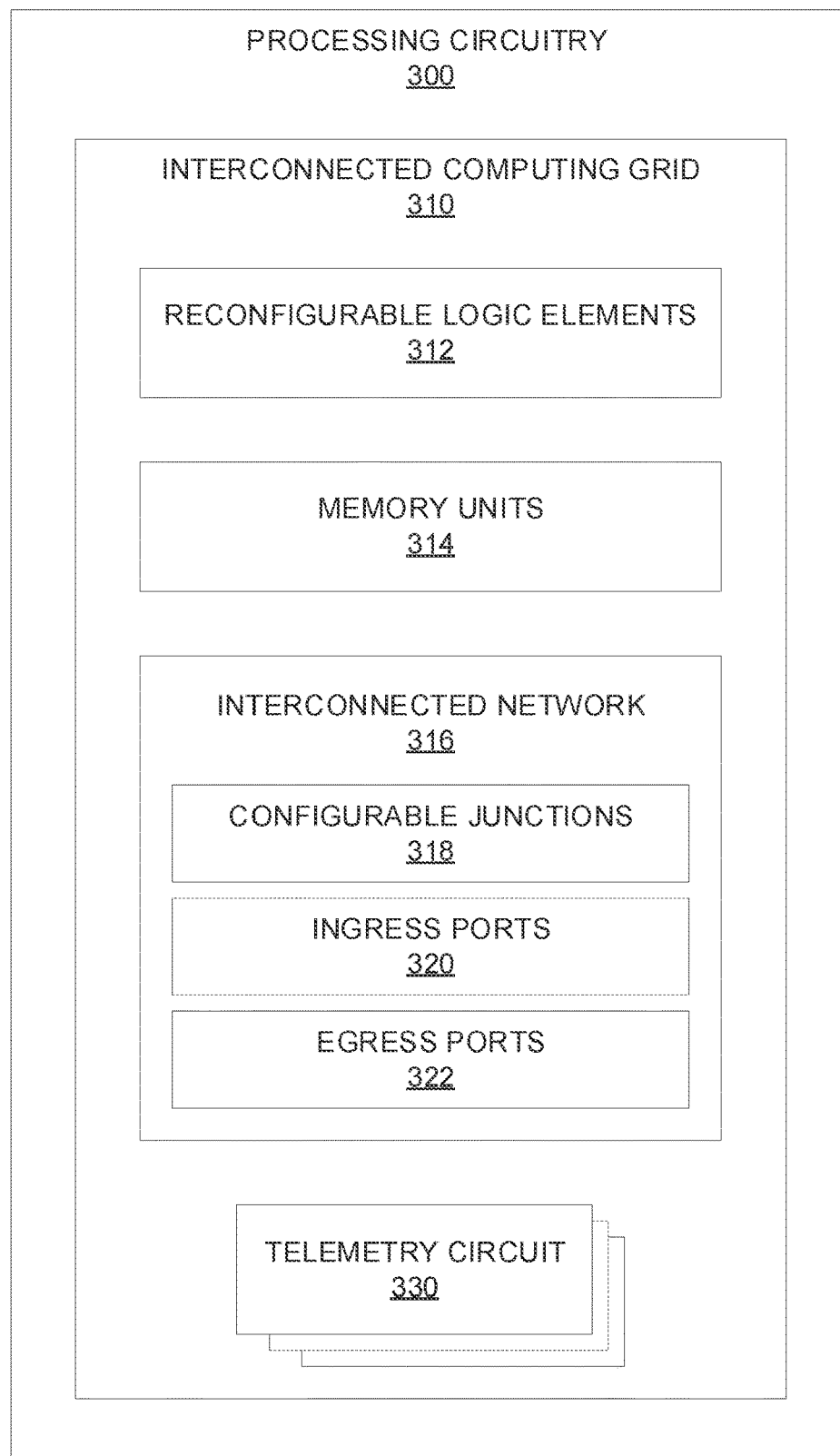
FIG. 3 is a schematic illustration of an exemplary specific architecture targeted for automatic generation of processing architecture-specific algorithms, according to some embodiments of the present invention.

Reference is now made to FIG. 3, which is a schematic illustration of an exemplary specific architecture targeted for automatic generation of processing architecture-specific algorithms, according to some embodiments of the present invention.

An exemplary processor 300, interchangeably designated processing circuitry 300, targeted for executing an algorithm such as the algorithm 202, may comprise an interconnected computing grid 310 comprising a plurality of reconfigurable logical elements 312 and a plurality of memory units 314 connectable via an interconnected network 316.

The interconnected network 316 may comprise a plurality of configurable data routing junctions 318, plurality of ingress ports 320 and a plurality of egress ports 322 which may be configured to connect between one or more of the reconfigurable logical elements 312 and/or one or more of the memory units 314.

The configurable data routing junctions 318 may be dynamically reconfigured to connect between one or more of the reconfigurable logical elements 312 and one or more other reconfigurable logical elements 312 and/or one or more of the memory units 314. Moreover, one or more of the ingress ports 320 and/or the egress ports 322 may be connected via the configurable data routing junctions 318 to further connect between one or more of the reconfigurable logical elements 312 and/or one or more of the memory units 314.

For example, a set of reconfigurable logical elements 312 may be interconnected via one or more configurable data routing junctions 308, and optionally additionally via one or more ingress ports 320 and/or egress ports 322. In another example, several reconfigurable logical elements 312 may be interconnected to each other and further connected to one or more memory units 314 via one or more configurable data routing junctions 318, and optionally additionally via one or more ingress ports 320 and/or egress ports 322.

The processing circuitry 300, specifically the interconnected computing grid 310 may optionally include hardware, for example, one or more telemetry circuitries 330, optionally for the purpose of collecting, capturing, recording and/or storing one or more statistical values, optionally while processing circuitry 300 executes one or more computational tasks, specifically, compute graphs and/or compute instructions.

The statistical values may include, for example, one or more data-statistic values relating to the data processed using the processing circuitry 300. In another example, the statistical values may include one or more statistical values relating to the compute graph executed using the processing circuitry 300, for example, one or more statistical values regarding the approximation interval. In another example, the statistical values may include one or more statistical values relating to the computation task executed using the processing circuitry 300, for example, one or more process iteration statistic values.

Optionally, the telemetry circuitry(s) 330 may further comprise one or more counters and/or one or more memory areas for collecting historical values of at least some of the data, the compute graph and/or the process executed using the processing circuitry 300. For example, the historical values may include one or more coefficients of the polynomial-based approximant previously selected during the current computation task (e.g., previous iterations) and/or one or more previous computation tasks. The historical values may further include one or more data variables, for example, a RISC-V processor counter, a high bandwidth memory controller counter, and a memory channel counter.

Reference is made once again to FIG. 1.

The algorithm parameters may further define a format of a target output (outcome, result) of the algorithm 202 executed by one or more processors utilizing the target processing architecture, for example, a desired accuracy, a target precision, a target binary format, and/or the like. The output format may define for example, a bit size of the target output, for example, 32-bit, 64-bit, 56-bit, and/or the like from which, as known in the art, precision, and/or accuracy of the output may be derived.

Optionally, one or more algorithm parameters may define one or more constraints for execution of the architecture-specific code segment(s) implementing the algorithm 202. The constraints may relate to one or more aspects, and/or elements of execution, for example, a precision of the output, an accumulated error, a hardware resources utilization, a compute graph size, a cost, an execution power consumption, and/or the like.

For example, one or more algorithm parameters may define a "numerical error bound" constraint relating to the accumulated error of the target output, for example, bound an estimated absolute and/or relative error of the target output of the algorithm 202 executed by the architecture-specific processor(s) by executing the architecture-specific code segment(s) implementing the algorithm 202.

In another example, one or more algorithm parameters may define a "hardware cost bound" relating to hardware resources utilization of the architecture-specific processor(s) executing the architecture-specific code segment(s) while executing the architecture-specific code segment(s) implementing the algorithm 202. The hardware utilization may be expressed and/or measured in one or more terms, metrics, and/or factors, for example, number of hardware elements (e.g., multipliers, memory cells, etc.), total hardware consumed by mapping of the algorithm 202, a latency, a compute graph size, and/or the like. The constraints may therefore define, for example, a hardware cost bound limiting, for example, the number of hardware elements, a maximal latency, a maximal compute graph size, and/or the like.

In another example, one or more algorithm parameters may define one or more restrictions for the implementation of the algorithm 202 for execution in the specific target processing architecture. For example, an optional algorithm parameter "LUT design and generation" and an optional algorithm parameter "Polynomial Approximation" may define, enforce, augment, adjust and/or restrict generation of Look-Up Tables (LUT) and approximating polynomials respectively, and use them as functional objects in the implementation of the algorithm 202 in the specific target processing architecture. Each of these functional objects may be further defined by one or more parameters, for example, a number of entries and/or width of entries in the LUT, polynomial properties of the approximating polynomial, and the like.

As shown at 104, the code constructor 220 may analyze the algorithm 202 to determine, automatically, a functionality of the algorithm 202, i.e., identify the problem solved by the algorithm 202, identify the method, sequence, and/or computation applied by the algorithm to solve the problem, and/or the like.

For example, continuing the previously described exemplary algorithm 202 implementing an elementary function (e.g., sine, cosine, etc.), based on analysis of the algorithm 202 the code constructor 220 may identify that the algorithm 202 implements a correctly-rounded computation of an elementary function by utilizing a polynomial approximation and/or a look-up table.

The code constructor 220 may apply one or more analysis and/or profiling methods, tools, techniques, and/or modes for analyzing the algorithm 202 to determine its functionality optionally including its performance and/or efficiency in solving one or more problems. The code constructor 220 may apply one or more analyses and/or profilers, for example, pseudocode analysis, flowchart analysis, mathematical analysis, static code analysis, dynamic code analysis and profiling, debugging, benchmarking, testing, and/or the like using one or more analyses tools such as, for example, MATLAB Profiler, Intel Advisor, JProfiler, SciPy, PyCharm Profiler, cProfile, CodeClimate, and/or the like.

For example, the code constructor 220 may analyze the algorithm 202 to identify the problem(s) solved by the algorithm 202 and compute, estimate, derive, predict and/or otherwise determine how and how optionally efficiently the algorithm 202 solves this problem(s). To this end, the code constructor 220 may analyze the algorithm 202 to identify the input data and the desired target output of the algorithm 202. The code constructor 220 may further analyze the algorithm 202 to identify any constraints and/or requirements that should be met by the algorithm 202 and its execution.

The code constructor 220 may therefore analyze the algorithm 202 to identify its inputs and outputs, i.e., data received as input by the algorithm 202 and the output data (outcome, result) produced and/or computed by the algorithm 202. The code constructor 220 may further estimate and/or determine time complexity of the algorithm 202 which may refer, for example, to execution time, latency, and/or the like of the algorithms' execution, typically as a function of its input size. Such analysis may comprise analyzing the number of basic operations performed by the algorithm 202 and the time of each such operation. The code constructor 220 may further estimate and/or determine space complexity of the algorithm 202 which may refer, for example, to resource utilization, for example, processing circuits, memory cells, and/or the like. The code constructor 220 may also estimate and/or determine performance and/or efficiency of the algorithm 202, for example, by testing and/or simulating the algorithm 202 with different inputs and measuring its execution time and memory usage.

As shown at 106, the code constructor 220 may select one or more of a plurality of architecture-specific computing blocks of the target processing architecture according to the functionality of the received algorithm 202 and the algorithm parameter(s) defined for the algorithm 202.

In particular, since the target processing architecture may be reconfigurable in runtime, one or more of the architecture-specific computing block(s) selected by the code constructor 220 may be dynamically reconfigurable computing blocks which may reconfigure in runtime according to the computation task they have to execute. For example, assuming the target processing architecture comprises the interconnected computing grid comprising the plurality of reconfigurable logical elements, the architecture-specific computing blocks selected by the code constructor 220 may include one or more of the reconfigurable logical elements, one or more of the memory units connectable via the interconnected network, and/or a combination thereof.

The code constructor 220 may fetch, receive, collect and/or otherwise obtain the architecture-specific computing blocks from one or more repositories either locally stored in the code generation system 200, for example, in the storage 214, and/or stored remotely in one or more remote network resources, for example, a server, a cloud service and/or the like accessible to the code generation system 200 on one or more networks.

Since the design of algorithms such as the algorithm 202 is based on mathematical operators which are well-defined functions, these mathematical operators may be designated architecture-specific computing blocks and may be mapped to the mathematical operations supported by the target processing architecture and/or to built-in functions used by the software stack of the target processing architecture.

As such, using the operators as supported by the target processing architecture, the algorithm 202 may be emulated exactly the way it should be computed on the target processing architecture. Each operator may properly define its expected result, as well as one or more additional execution attributes such as, for example, hardware cost, accuracy, relative (numerical) error, and/or the like.

These mathematical operators of the target processing architecture may therefore serve as basic architecture-specific computing blocks of the target processing architecture which may be used for implementing the algorithm 202. Each of the architecture-specific computing blocks may be associated with one or more parameters, attributes and/or properties, collectively designated properties, which may define its operation and/or execution.

For example, assuming a target 32-bit processing architecture supports integer multiplication, integer addition, binary shift right/left, and bitwise operations, one or more computing blocks may be defined to operate on 32-bit unsigned integers, for example, multiplication (UMUL) and addition (UADD), logical shifts such as shift left (SHL), shift right (SHR), bitwise operators such as AND, OR, NOT, XOR, and/or the like.

Following is an exemplary construction of a UMUL computing block. Assuming, for the purpose of the example, that the variables are in fixed-point format $Q_{1,31}$, in order to correctly execute a multiply operation the following instructions need to be issued:

Perform integer full-product multiplication

Scale the full-product by the configured scaling property

Check if the resulting scaled product fits the output bit width

If not, log a warning message that loss of accuracy is observed

Set numerical error according to the truncated bits and rounding mode

The representation in terms of computing blocks may ensure that the computation of the algorithm 202 is performed exactly as by processor(s) utilizing the target processing architecture since each computing block implements the required operation (operator) only in terms of elementary compute operations that are available and supported by the target processing architecture.

Each of the plurality of architecture-specific computing blocks may therefore comprise one or more mathematical operators, for example, linear operators, scalar operators, vector operators, and/or the like which may be applicable for numbers expressed and/or represented in one or more formats, for example, floating-point, integer, fixed-point, and/or the like.

According to the mathematical operator(s) it implements, each architecture-specific computing block may be associated with one or more attributes indicative of its operation, implementation, execution and/or the like, for example, its hardware cost (e.g., utilized hardware, execution time, power consumption, etc.), accuracy, relative (numerical) error, and/or the like.

Optionally, in addition to the (basic) architecture-specific computing blocks implementing elementary mathematical operators, the architecture-specific building blocks may further include one or more complex (higher-level) architecture-specific computing block which may be each constructed of multiple other architecture-specific computing blocks of the target processing architecture.

Each complex architecture-specific computing block may comprise a set of architecture-specific computing blocks, whether basic and/or other complex computing blocks, having inputs and/or outputs which are logically concatenated so as to facilitate, implement, and/or obtain a more complex operation (operator).

Since each of the basic architecture-specific computing blocks may explicitly define its attributes, for example, an error, the error of each complex architecture-specific computing block may be computed, derived, estimated, determined and/or otherwise inferred by aggregating the error of each of the multiple architecture-specific computing blocks of the set constituting the respective complex architecture-specific computing block.

Following is an exemplary construction of a complex computing block configured to multiply numbers having greater width than the width of the supported hardware multiplier computing block. As described for the previous example, assuming the numbers are in fixed-point format $Q_{1,63}$, following instructions need to be issued:
  Sub-split parameters into words of supported length
  Call the UMUL computing block for multiplication of each pair of words
  Call comparison and addition computing blocks in order to compute and propagate carry
  Scale the full-product by the configured scaling property
  Check if the resulting scaled product fits the output bit width
  If not, log a warning message that loss of accuracy is observed
  Set numerical error according to the truncated bits and rounding mode In this example, the numerical error of the multiplication may be computed similarly as computed for the basic architecture-specific computing block constituting it or by aggregating their errors.

However, in some cases, the aggregated error may not accurately reflect the numerical error of one or more complex architecture-specific computing blocks such that it may be impossible to directly infer their numerical error. In such a case, the numerical error may be computed using one or more other tools, for example, an error estimation tool adapted to derive the attributes of complex computing blocks, for example the numerical error from the building blocks composing it. In another example, the numerical error of one or more complex architecture-specific computing blocks may be set manually.

For example, a Newton-Raphson step architecture-specific computing block may be composed of several architecture-specific multiplication and addition computing blocks. Newton-Raphson step may be formulated by $r_n \times (2 - b \times r_n)$.

Assuming the operations are unsigned integer operations with variables in fixed-point format, a Newton-Raphson (NR_STEP) computing block may be defined as follows:
  NR_STEP(previous_nr_result, b):
  $r_1$=UMUL(previous_nr_result, b)
  $r_2$=SUB(0x80000000, $r_1$)
  $r_3$=UMUL($r_1$, $r_2$)

The Newton-Raphson step computing block may be used to implement one or more algorithms such as the algorithm 202 which utilizing the Newton-Raphson step, for example:
  ALG(arg1):
  $r_1$= . . .
  $r_2$= . . .
  $r_3$=NR_STEP ($r_1$, $r_2$)
  $r_4$= . . . .

The attributes of the complex computing blocks may be derived from the attributes of the building blocks that compose it, unless overridden. For example, the hardware cost of the Newton-Raphson complex computing block may be derived by aggregating the hardware cost of the computing blocks composing the Newton-Raphson complex computing block.

The error of the Newton-Raphson complex computing block, however, may not be directly derived from the errors of its composing computing blocks. The correct numerical error of the Newton-Raphson step may be mathematically derived from a context knowledge that computing blocks may be unaware of and may be therefore computed using error estimation too(s) and/or manually set.

Each of the plurality of architecture-specific computing blocks may be associated with simulation code and execution code.

The simulation code of each architecture-specific computing block may simulate the functionality of the respective architecture-specific computing block as if executed in the target processing architecture and may issue computation instructions of the building block resulting in computation operation(s) applied to the properties and/or parameters of the respective computing block.

The simulation code may be oblivious to processing architecture and may be thus executed by practically any processor independent of its processing architectures. For example, the simulation code may be executed by the code constructor 220 executed by the processor(s) 212 which may employ an architecture different from the target processing architecture. As such, the code constructor 220 may execute the simulation code of the selected architecture-specific computing block(s) to emulate execution of the selected architecture-specific computing block(s) by processor(s) utilizing the target processing architecture.

The execution code of each architecture-specific computing block, on the other hand, may comprise code executable by the processor(s) utilizing (employing) the target processing architecture to implement the functionality, i.e., conduct (perform) the computation operation(s) of the respective computing block according to its properties. The execution code may comprise, for example, hardware (e.g. IP core, etc.), firmware and/or software (e.g., source code, object code, executable code, etc.) and/or the like and/or a combination thereof.

As shown at 108, the code constructor 220 may construct an emulated architecture-specific algorithm, emulating and/or prototyping the algorithm 202, from the architecture-specific computing blocks selected according to the functionality of the algorithm 202.

Specifically, the code constructor 220 may use the simulation code of the selected architecture-specific computing blocks to generate one or more code segments emulating the algorithm 202 as it may be executed in the target processing architecture, i.e., by one or more processors utilizing the target processing architecture.

Since the emulated architecture-specific algorithm is a sequence of instructions that use only the defined computing blocks supported by the target processing architecture and/or its software stack, the emulated architecture-specific algorithm may emulate the algorithm 202 as it may be ultimately executed by the target processing architecture with identical accuracy, reliability and/or consistency.

Moreover, for some target processing architectures, for example, an interconnected computing grid based processing architecture such as the processing circuitry 300 comprising one or more interconnected computing grid such as the interconnected computing grid 310, the code constructor 220 may generate a compute graph projecting the algorithm 202 over the hardware elements of the interconnected computing grid 310. To this end, the code constructor 220 may generate source code that includes all necessary definitions and implementations of the computing blocks selected for implementing the algorithm 202. The source code may have a special layout that is required for generating a compute graph of the implemented functions only without additional program code for actual execution of the implemented function. In addition, the source code may have special instructions for optimizing the compute graph.

As shown at 110, the code constructor 220 may test the emulated architecture-specific algorithm to verify compliance of the architecture-specific algorithm with the one or more received algorithm parameters defining the execution of the algorithm 202 by the target processing architecture.

In particular, the code constructor 220 may verify that the (target) output (result, outcome) of the architecture-specific algorithm complies with one or more constraints defined by one or more of the algorithm parameters.

Since the emulated architecture-specific algorithm is a set of the architecture-specific computing blocks, evaluating and/or testing the architecture-specific algorithm practically results in evaluating each of its composing computing blocks.

The code constructor 220 may apply one or more methods for testing the emulated architecture-specific algorithm. For example, the code constructor 220 may simulate the emulated architecture-specific algorithm by applying it to a set of randomly generated numbers which may include floating-point, integer and/or fixed-point numbers. The code constructor 220 may further define and/or generate one or more test algorithm parameters defining the execution of the emulated architecture-specific algorithm and/or its output. As described herein before, the algorithm parameters generated for testing the emulated architecture-specific algorithm may essentially comprise the target processing architecture and the target format, i.e., the format of the target output computed by the algorithm 202 executed on the target processing architecture.

The code constructor 220 may further generate one or more optional test algorithm parameters, for example, a range for the random number, a constraint on an input of the algorithm 202, a constraint on an output of the algorithm 202, a constraint on an intermediate result, and/or the like. For example, the code constructor 220 may generate floating-point numbers given algorithm parameters, for example constraints and/or pre-defined bit patterns for the various fields of the floating-point format. Each such algorithm parameter which distinct the generated numbers, may be designated a feature and each generated number may be designated a featured number.

The code constructor 220 may generate featured numbers which may cover the input range of the algorithm 202. In the case of floating-point numbers, the code constructor 220 may generate numbers by sub-splitting the provided range to binades which each comprises a set of numbers in a binary IEEE-754 floating-point format all having the same exponent, and subsequently, generate floating-point numbers for each feature. In the case of fixed-point numbers, the code constructor 220 may generate numbers by subdividing the integer part of the input range into smaller ranges, each defining a feature range. The code constructor 220 may apply a similar approach for generating fixed-point numbers for each feature.

As described herein before, one or more constraints defined by the algorithm parameters relating to the received algorithm 202 may define a bound for an acceptable, desired and/or maximal error, for example, a relative and/or an absolute error of the architecture-specific algorithm when executed by a processor utilizing (employing) the target processing architecture.

The code constructor 220 may therefore compute an estimated error of the emulated architecture-specific algorithm based on an error, for example, a relative error, an absolute error, and/or the like of the selected architecture-specific computing block(s) which may be typically defined for each architecture-specific computing block.

For example, assuming the algorithm 202 computes a polynomial in fixed-point arithmetic and further assuming that input variable $r_n$ and coefficients $c_n$ of the polynomial are provided in fixed-point format represented as 32-bit integers as follows:

POLY(x):
$r_1$=UMUL(x, $c_1$)
$r_2$=ADD($r_1$, $c_2$)
$r_3$=UMUL(x, $r_2$)
$r_4$=ADD($r_3$, $c_2$)
$r_5$=UMUL(x, $r_4$)

The UMUL computing block may be configured for its numerical settings and set having a numerical error of $2^{-f}$, where f is the fraction of the fixed-point format in use. The code constructor 220 may compute the estimated numerical error of POLY( ) by inspecting each of the computing blocks in use. For the exemplary fixed-point polynomial algorithm, the numerical error of POLY( ) is $3 \times 2^{-f}$.

As described herein before, one or more constraints defined by the algorithm parameters relating to the received algorithm 202 may define an acceptable, desired and/or maximal error, relative and/or absolute. The code constructor 220 may therefore compute an estimated error of the emulated architecture-specific algorithm based on an error of the selected architecture-specific computing block(s) which may be typically defined for each architecture-specific computing block.

Another constraint defined by the algorithm parameters relating to the received algorithm 202 may define a bound for an acceptable, desired and/or maximal resource utilization of the architecture-specific algorithm when executed by a processor utilizing (employing) the target processing architecture.

The code constructor 220 may therefore compute an estimated resource utilization of the emulated architecture-specific algorithm based on the resource utilization of the selected architecture-specific computing block(s) which may be typically defined for each architecture-specific computing block.

The resource utilization estimation may comprise, for example, estimation of area consumed by the architecture-specific algorithm on the processing circuit IC utilizing the target processing architecture, count of hardware elements (e.g., adders, shifts, multipliers, memory, etc.) of the target processing architecture, and/or the like. This estimation may be done based on the respective resource utilization attributes defined for the architecture-specific computing block(s) selected for implementing the algorithm 202. In another example, the resource utilization estimation may include estimating an expected latency based on the latency of the selected architecture-specific computing block(s). In another example, the resource utilization estimation may include estimating a power consumption of the architecture-specific algorithm based on the power consumption of the selected architecture-specific computing block(s).

For example, assuming that one UMUL computing block has a latency of 2 time units and consumes an area of 40 area units on a target processing circuit IC utilizing the target processing architecture. Further assuming that a SUB computing block has a latency of 1 time unit and consumes an area of 20 area units. Consequently, the latency estimated for the NR_STEP algorithm, which implements 2 UMUL computing blocks and 1 SUB computing block, may be 5 time units and the estimated area consumed by the NR_STEP algorithm may be 100 area units.

It should be noted that the estimations computed by the code constructor 220 are bound to the overall hardware utilization and these estimations may not take into consideration possible instruction parallelism or compiler optimizations.

As shown at 112, which is a conditional step, the code constructor 220 may check whether or not the architecture-specific algorithm complies with the one or more algorithm parameters in order to verify its compliance. Specifically, the code constructor 220 may check whether the target output of the architecture-specific algorithm complies with the constraint(s) defined by the algorithm parameter(s).

In case the architecture-specific algorithm complies with the algorithm parameter(s), the process may branch to 118. However, in case the architecture-specific algorithm does not comply with the algorithm parameter(s), the process may branch to 114. Optionally, in case the architecture-specific algorithm does not comply with the algorithm parameter(s), the process may branch to 116.

As shown at 114, the process 100 may be an iterative process in which the code constructor 220 may initiate one or more additional iterations of the process 100 with one or more adjusted properties of one or more of the selected architecture-specific computing blocks. As such, the code constructor 220 may adjust one or more of the properties (attributes, parameters) of one or more of the architecture-specific computing blocks selected for constructing the emulated architecture-specific algorithm and branch back to step 110 to re-test the architecture-specific algorithm.

For example, the code constructor 220 may adjust one or more of the properties of one or more of the selected architecture-specific computing blocks according to the estimated error, optionally compared to one or more of the numerical error bounds (e.g., absolute error, relative error). In another example, the code constructor 220 may adjust one or more of the properties of one or more of the selected architecture-specific computing blocks according to one or more other constraints defined for architecture-specific algorithm, for example, the hardware utilization (hardware cost) of the architecture-specific computing blocks constituting the architecture-specific algorithm.

Verifying compliance with the constraints, for example, the numerical error bounds and/or the hardware utilization bound may ensure that the architecture-specific algorithm constructed using the selected architecture-specific computing blocks may work exactly as expected on the target processing architecture. Moreover, importantly, the numerical error bounds and/or hardware utilization may be known in advance before deployed in the target processing architecture. The architecture-specific algorithm may be tested for a certain number of iterations, either predefined and/or dynamically defined, using provided test vectors or pre-set patterns.

Optionally, the code constructor 220 may apply one or more optimization tools, methods, and/or techniques to optimize the architecture-specific computing blocks, specifically their properties in order to comply with the constraints defined by the algorithm parameters. Properties adjustment may be done to any building block that is enabled for automatic optimization/adjustment.

For example, assuming that the received algorithm 202 computes a sine approximation in the full range of the target format. Further assuming the algorithm 202 comprises three main steps, namely, range reduction, polynomial approximation in the reduced range, and reconstruction. Exceptions handling may be omitted since they may be straightforward. However, the polynomial approximation phase has many arguments that may affect the accuracy of the final result.

The code constructor 220 may estimate and evaluate one or more of the relative errors and, in case the observed absolute and/or relative error do not comply with respective constraints, i.e., required absolute or required relative error, the code constructor 220 may adjust one or more properties of the computing blocks selected for implementing the sine approximation and branch back to 110 to evaluate the adjusted design and its absolute and/or relative errors. For example, assuming the polynomial approximation computing block supports adjustment, and/or selection of a degree of the polynomial. In such a case, the code constructor 220 may increase the degree of the approximating polynomial until the relative error constraint is satisfied, i.e., complied with.

In another example, a UMUL computing block may have one or more properties defining a multiplier bit-width and/or a scaling back factor. The code constructor 220 may compute, at each multiplication performed using the UMUL computing block, the loss in accuracy due to the respective computation. In case the accuracy loss is above a certain threshold, the code constructor 220 may attempt to increase the accuracy, for example, by increasing the bit-width and/or the scaling factor.

Optionally, in case the process 100 fails to converge, i.e., the result of the architecture-specific algorithm fails to comply with one or more of the constraints in a certain number of iterations, the code constructor 220 may relax one or more of the constraints to allow compliance of the result of the architecture-specific algorithm with the relaxed constraint(s).

As shown at 116, which is an optional step, in case of failure of the emulated architecture-specific algorithm to comply with the algorithm parameter(s), the process 100 may be further extended to iterate in one or more additional iterations with one or more adjusted selections of the architecture-specific computing block(s) to implement the architecture-specific algorithm. This means that the code constructor 220 may alter the selection, for example, add, replace, and/or remove one or more of the computing blocks and branch back to step 108 to construct a new architecture-specific algorithm using the adjusted selection of computing blocks.

For example, assuming the target architecture supports both 32-bit and 64-bit operations and the code constructor 220 initially selects 32-bit computing block(s) to implement the architecture-specific algorithm. Further assuming that the architecture-specific algorithm constructed using 32-bit architecture-specific computing block(s) fails to comply with a certain constraint defined by the algorithm parameter(s), for example, absolute error. In such a case, the code constructor 220 may adjust the selection of architecture-specific computing block(s) and may select 64-bit computing block(s) to implement the architecture-specific algorithm which may yield an improved accuracy that may possibly comply with the absolute error constraint. The 64-bit computing blocks may be implemented via 32-bit computing blocks if the architecture does not support 64-bit operations.

After adjusting the selection, the code constructor 220 may branch back to step 110 to re-test the architecture-specific algorithm implemented with the different selection of architecture-specific computing block(s) to evaluate its compliance with the algorithm parameter(s), specially evaluate compliance of the target output of the architecture-specific algorithm with one or more of the constraints defined by the algorithm parameter(s).

As shown at 118, the code constructor 220 may generate automatically an architecture-specific code comprising one or more architecture-specific code segments implementing the architecture-specific algorithm based on the execution code of the selected architecture-specific computing block(s).

In particular, the code constructor 220 may generate the architecture-specific code using the execution code of the architecture-specific computing block(s) selected to implement the architecture-specific algorithm which was verified to comply with the algorithm parameter(s), specifically with the constraint(s) defined by the algorithm parameter(s). For example, the code constructor 220 may arrange, integrate, and/or organize the execution code of (associated with) the selected architecture-specific computing block(s).

Optionally, the code constructor 220 may include additional code, i.e., one or more program instructions required for migrating the execution code of the selected architecture-specific computing block(s) to an execution environment of the target processing architecture. For example, the code constructor 220 may add glue logic instructions to the architecture-specific code segment(s). In another example, the code constructor 220 may add I/O instructions to establish input and/or output interfaces for the architecture-specific code.

The code constructor 220 may generate the architecture-specific code in a form and/or format suitable for immediate use by one or more target toolchains, i.e., toolchain adapted for the target processing architecture. For example, the architecture-specific code segment(s) may comprise source code, for example, C, C++, assembly, and/or the like which may be compiled, linked, and/or built using one or more of the target toolchains.

Moreover, the code constructor 220 may further compile, link, and/or build the architecture-specific code segment(s) to generate one or more executable code segments which may be executed by one or more processors utilizing the target processing architecture.

Optionally, the architecture-specific code segment(s) generated by the code constructor 220 for an interconnected computing grid based processing architecture may comprise and/or implement one or more compute graphs adapted for the target processing architecture which may project the algorithm 202 over the hardware elements of the an interconnected computing grid such as the interconnected computing grid 310.

As shown at 120, the code constructor 220 may output the architecture-specific code. For example, the code constructor 220 may store the architecture-specific code in its local storage, for example, the storage 214 from which it may be retrieved by one or more other devices, systems, services, and/or the like. In another example, the code constructor 220 may transmit the architecture-specific code to one or more remote devices, systems, services, and/or the like via the I/O interface 210, over one or more networks.

The architecture-specific code segment, when executed by one or more processors utilizing the target processing architecture, may cause these processors to execute the algorithm 202.

Figure 4:
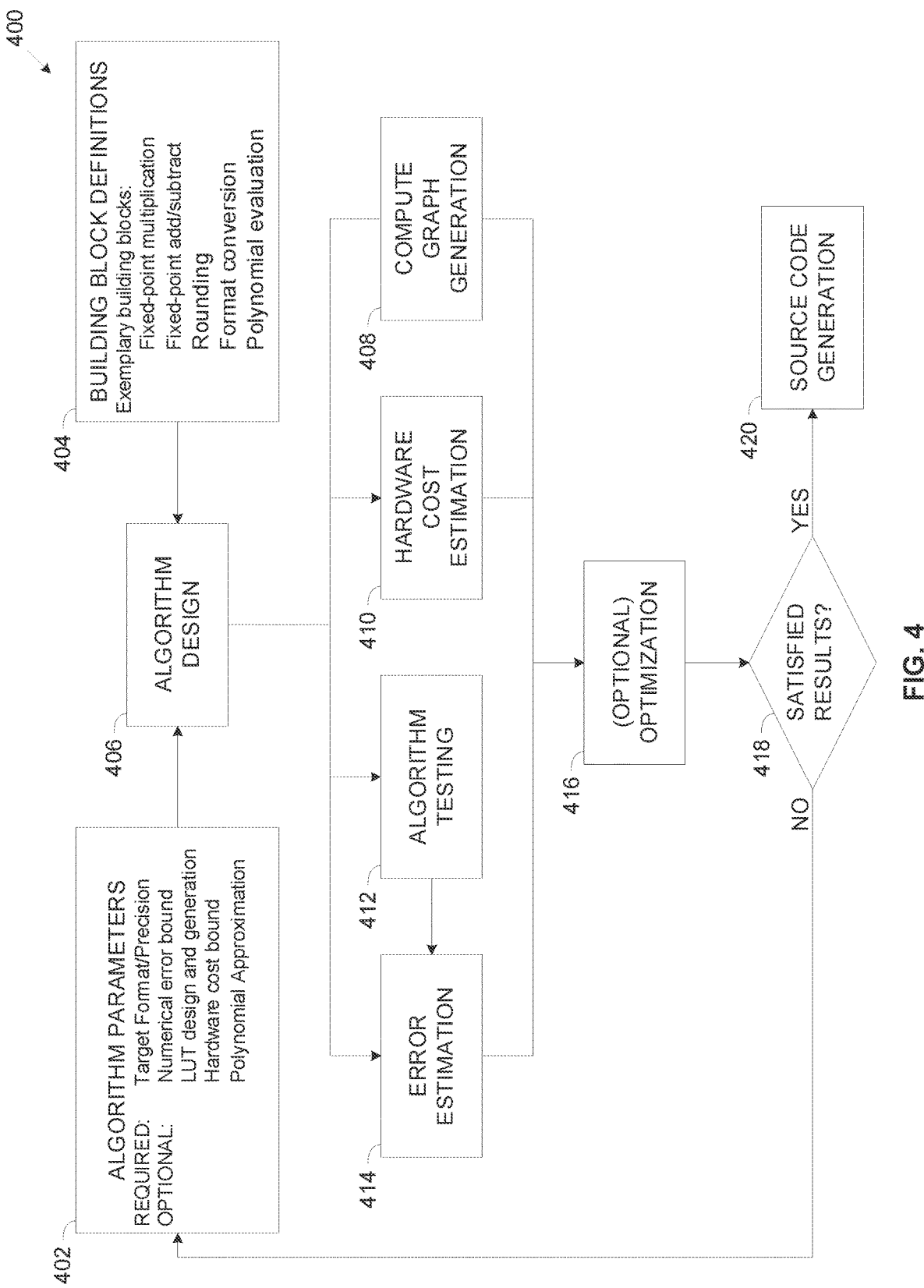
FIG. 4 is a block diagram of an exemplary sequence of automatically generating processing architecture-specific algorithms, according to some embodiments of the present invention.

Reference is now made to FIG. 4, which is a block diagram of an exemplary sequence of automatically generating processing architecture-specific algorithms, according to some embodiments of the present invention.

An exemplary sequence 400 describes generation of source code for an exemplary algorithm such as the algorithm 202, for example, an algorithm designed and adapted to approximate a sine function for IEEE-754 binary32 format using a fixed-point format. The sequence 400 may be executed by a code constructor such as the code constructor 220 executing a process such as the process 100.

As shown at 402, the code constructor 220 may receive the algorithm 202 and receive and/or extract one or more algorithm parameters as described in step 102) of the process 100. For the exemplary sine approximation algorithm, the algorithm parameters may comprise, for example, target output format is binary32, relative error bound by default is $$\frac{1}{2}$$

ULPs, no bounds on hardware utilization, no LUTs to be used. The algorithm parameters may further comprise parameters relating to the polynomial approximation, for example, approximation interval, degree, coefficients' precision, and/or the like.

As shown at 404, the code constructor 220 may select one or more architecture-specific computing blocks of the target processing architecture as described in step 106 of the process 100, typically based on analysis of the algorithm 202 to determine its functionality as described in step 104 of the process 100. For the exemplary sine approximation algorithm, the code constructor 220 may select the following architecture-specific computing blocks:

UMUL64: 64-bit unsigned integer multiplication computing block which returns the high 64-bits of the full-precision result,
    has a scaling property for rescaling the result to the required target output fixed-point format
UADD64: 64-bit unsigned integer addition/subtraction computing block
FP32_TO_FXP: binary32 floating-point to fixed-point conversion computing block, integer and fraction parts of the fixed-point format are properties of the computing block POL_APPROX_SINE: sine polynomial approximation computing block ROUND_TO_FP32: fixed-point to binary32 format rounding computing block As shown at 406, the code constructor 220 may construct (prototype) an architecture-specific algorithm using the selected computing blocks as described in step 108 of the process 100. For the exemplary sine approximation algorithm, the code constructor 220 may perform the following:

Conversion to fixed-point using the FP32_TO_FXP computing block

Range reduction, evaluation of the polynomial, and reconstruction are executed using the selected computing blocks Obtain final result using the ROUND_TO_FP32 computing block As shown at 408, the code constructor 220 may further generate a compute graph and obtain graph dimensions as described in step 108 of the process 100, specifically in case the target processing architecture is an interconnected computing grid based processing architecture such as the processing circuitry 300.

As shown at 410, the code constructor 220 may derive, compute, and/or otherwise estimate the hardware cost, i.e., the hardware utilization of the architecture-specific algorithm based on the hardware utilization of the selected architecture-specific computing blocks.

As shown at 412, the code constructor 220 may test and/or evaluate the architecture-specific algorithm using a set of generated test vectors as described in steps 110 and 112. For example, as shown at 414, the code constructor 220 may set the worst observed numerical error as the numerical error of the architecture-specific algorithm.

As shown at 416, the code constructor 220 may optimize the architecture-specific algorithm as described in step 114 of the process 100.

As shown at 418, the code constructor 220 may verify that the architecture-specific algorithm, specifically the output of the architecture-specific algorithm complies with one or more of the constraints defined by the algorithm parameters as described in step 118 of the process 100, for example, the error bound, the hardware cost bound, and/or the like.

In case, the architecture-specific algorithm fails to comply with the constraint(s), the code constructor 220 may initiate one or more additional iterations as described in steps 114, and/or 116 to adjust selection of the architecture-specific computing block(s) constructing the architecture-specific algorithm, and/or their property(s) in attempt to comply with the constraint(s).

As shown at 420, in case, the results are satisfactory, i.e., the architecture-specific algorithm complies with the constraint(s), the code constructor 220 may generate a source code for execution of the algorithm 202 by one or more processors utilizing the target processing architecture.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms processor architectures and interconnected computation grid are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of generating automatically architecture-specific algorithms, comprising:
    receiving an architecture independent algorithm, and at least one algorithm parameter defining at least a target processing architecture and a format of an output to be produced by execution of an architecture-specific algorithm implementing the received algorithm;
    automatically identifying at least one of a problem solved by the algorithm and a method applied by the algorithm to solve the problem;
    selecting at least one of a plurality of architecture-specific computing blocks of the target processing architecture according to the at least one algorithm parameter and a functionality of the algorithm determined by the identification of the at least one of the problem and method, each of the plurality of architecture-specific computing blocks is dynamically reconfigurable in runtime according to the functionality of the algorithm, each of the plurality of architecture-specific computing blocks is associated with (1) simulation code simulating functionality of the respective architecture-specific computing block, and (2) execution code executing the functionality of the respective architecture-specific computing block;
    testing an emulated architecture-specific algorithm constructed using the simulation code of the at least one selected architecture-specific computing block to verify compliance with the at least one algorithm parameter; and
    responsive to successful compliance verification, generating automatically an architecture-specific code segment implementing the architecture-specific algorithm based on the execution code of the at least one selected architecture-specific computing block;
    wherein when executed by at least one processor utilizing the target processing architecture, the architecture-specific code segment causes the at least one processor to execute the algorithm.

2. The method of claim 1, wherein the plurality of dynamically reconfigurable architecture-specific computing blocks comprise a plurality of reconfigurable logical elements supported by a plurality of memory units connectable via an interconnected network of an interconnected computing grid.

3. The method of claim 1, wherein the architecture-specific code segment comprises at least one program instruction required for migrating the execution code of the at least one architecture-specific computing block to an execution environment of the target processing architecture.

4. The method of claim 1, wherein the architecture-specific code segment comprises source code compiled and built using a toolchain adapted for the target processing architecture.

5. The method of claim 1, wherein the architecture-specific code segment comprises a compute graph adapted for the target processing architecture.

6. The method of claim 1, wherein the format of the output defines a precision of the output of the architecture-specific algorithm.

7. The method of claim 1, further comprising computing an estimated error of the emulated architecture-specific algorithm based on an error of the at least one selected architecture-specific computing block.

8. The method of claim 7, further comprising adjusting at least one property of at least one selected architecture-specific computing block according to the estimated error.

9. The method of claim 1, further comprising computing an estimated resource utilization of the architecture-specific algorithm based on resource utilization of the at least one selected architecture-specific computing block.

10. The method of claim 1, wherein the at least one algorithm parameter further defines at least one constraint relating to at least one of: a precision of the output, an accumulated error, a hardware resources utilization, a compute graph size, a cost, and an execution power consumption.

11. The method of claim 10, further comprising, responsive to failure to comply with the at least one constraint, emulating the architecture-specific algorithm with a different selection of at least one of the plurality of architecture-specific computing blocks.

12. The method of claim 10, further comprising, responsive to failure to comply with the at least one constraint, relaxing the at least one constraint.

13. The method of claim 10, further comprising, responsive to failure to comply with the at least one constraint, adjusting at least one property of at least one selected architecture-specific computing block.

14. The method of claim 1, wherein each of the plurality of architecture-specific computing blocks comprises at least one mathematical operator applied to at least one member of a group consisting of: floating-point, integer, and fixed-point.

15. The method of claim 1, wherein the plurality of architecture-specific computing blocks comprise at least one complex architecture-specific computing block constructed of multiple architecture-specific computing blocks.

16. The method of claim 15, wherein an error of the at least one complex architecture-specific computing block is computed by aggregating an error of each of the multiple architecture-specific computing blocks constituting the at least one complex architecture-specific computing block.

17. The method of claim 1, wherein the execution code of each of the plurality of architecture-specific computing blocks comprises at least one of: hardware, firmware, software, and/or a combination thereof.

18. The method of claim 1, wherein the target processing architecture comprises at least one of a plurality of processing architectures.

19. A system for generating automatically architecture-specific algorithms, comprising:
- at least one processor executing a code, the code comprising:
- program instructions to receive an architecture independent algorithm and at least one algorithm parameter defining at least a target processing architecture and a format of an output to be produced by execution of an architecture-specific algorithm implementing the received algorithm;
- program instructions to automatically identify at least one of a problem solved by the algorithm and a method applied by the algorithm to solve the problem;
- program instructions to select at least one of a plurality of architecture-specific computing blocks of the target processing architecture according to the at least one algorithm parameter and a functionality of the algorithm determined by the identification of the at least one of the problem and method, each of the plurality of architecture-specific computing blocks is dynamically reconfigurable in runtime according to the functionality of the algorithm, each of the plurality of architecture-specific computing blocks is associated with (1) simulation code simulating functionality of the respective architecture-specific computing block, and (2) execution code executing the functionality of the respective architecture-specific computing block;
- program instructions to test an emulated architecture-specific algorithm constructed using the simulation code of the at least one selected architecture-specific computing block to verify compliance with the at least one algorithm parameter; and
- program instructions to generate automatically, responsive to successful compliance verification, an architecture-specific code segment implementing the architecture-specific algorithm, based on the execution code of the at least one selected architecture-specific computing block;
- wherein when executed, by at least one processor utilizing the target processing architecture, the architecture-specific code segment causes the at least one processor to execute the algorithm.

20. The system of claim 19, wherein the plurality of dynamically reconfigurable architecture-specific computing blocks comprise a plurality of reconfigurable logical elements supported by a plurality of memory units connectable via an interconnected network of an interconnected computing grid.

* * * * *